United States Patent
Han et al.

(10) Patent No.: US 6,871,237 B2
(45) Date of Patent: Mar. 22, 2005

(54) SYSTEM FOR CONTROLLING DATA TRANSFER PROTOCOL WITH A HOST BUS INTERFACE

(75) Inventors: Jong Seok Han, Taejon (KR); Yong Seok Choi, Taejon (KR); Sang Man Moh, Taejon (KR); Myung-Joon Kim, Taejon (KR); Kee-Wook Rim, Kyonggido Kwangju (KR)

(73) Assignee: Electronics and Telecommunication Research Institute, Taejon (KR)

( * ) Notice: Subject to any disclaimer, the term of this patent is extended or adjusted under 35 U.S.C. 154(b) by 0 days.

(21) Appl. No.: 10/418,127

(22) Filed: Apr. 18, 2003

(65) Prior Publication Data

US 2004/0122988 A1 Jun. 24, 2004

(30) Foreign Application Priority Data

Dec. 20, 2002 (KR) ................................ 10-2002-0081819

(51) Int. Cl.[7] .............................................. G06F 13/14
(52) U.S. Cl. ............................... 710/5; 710/22; 710/52; 710/308; 710/310; 710/314; 709/212
(58) Field of Search ................................. 710/5, 15–22, 710/52, 308–315, 40, 147–150, 28, 36; 709/212–219

(56) References Cited

U.S. PATENT DOCUMENTS 5,828,901 A * 10/1998 O'Toole et al. ............... 710/22
6,163,820 A * 12/2000 Garrett et al. ................. 710/33
6,199,137 B1   3/2001 Aguilar et al.
6,400,730 B1   6/2002 Latif et al.
6,459,698 B1  10/2002 Acharya
6,651,119 B2 * 11/2003 Ghodrat et al. ............... 710/40

* cited by examiner

Primary Examiner—Jeffrey Gaffin
Assistant Examiner—Mike Nguyen
(74) Attorney, Agent, or Firm—Mayer, Brown, Rowe & Maw LLP

(57) ABSTRACT

The present invention is a data transfer protocol control system with a host bus interface that includes a transmitting/receiving command DMA, a transmitting data DMA and a receiving data DMA for controlling data transfer protocol with a host bus interface considering characteristic, usage frequency, simultaneous processing functions of the command DMA and the data DMAs. A host interface bus is efficiently used and bus usage ratio is distributed properly to support transfer flow properly and improve the entire system performance. The data transfer protocol control system with a host bus interface includes a transmitting/receiving command DMA for instructing the command DMA request buffer to read and write command message data, a transmitting data DMA for instructing the transmitting data DMA request buffer to read the command message data, a receiving data DMA for instructing the receiving data DMA request buffer to write the command message data and a data transfer protocol control device for putting read information, write information and message data on a host bus, receiving message data and a transfer response signal and delivering the message data through the response buffer of the corresponding DMA.

16 Claims, 8 Drawing Sheets

SYSTEM FOR CONTROLLING DATA TRANSFER PROTOCOL WITH A HOST BUS INTERFACE

BACKGROUND OF THE INVENTION

1. Field of the Invention

The present invention relates to a system for controlling data transfer protocol with a host bus interface, and more particularly, to a system for controlling data transfer protocol with a host bus interface used to transfer data with a host processor in implementing Infiniband host channel adaptor to transfer data at a single server system or a cluster system.

2. Discussion of the Related Art

Generally, an Infiniband interconnect network includes a host channel adapter, a target channel adapter and an Infiniband switch.

The host channel adapter is positioned at the side of a host processor, and transmits and receives data to and from a remote host channel adapter or the target channel adapter. The Infiniband switch is positioned at the middle between the host channel adapter and the remote host channel adapter or the target channel adapter and used to expand the Infiniband interconnect network or to control its paths. The host channel adapter has an Infiniband interface to perform the functions described above and a host processor interface to interface a host processors.

On the other hand, many kinds of host channel adapters have been developed to have PCI/PCI-X host bus interface, but each of them has individual configuration and implementation so that their implementation results are different from each other.

For example, Yatin R. Acharya suggests a new mapping method in U.S. Pat. No. 6,456,698 ('Supporting mapping of layer 3 priorities in an Infiniband network). In general, TOS information included in a conventional Internet protocol (IP) packet header and a setting value of service level (SL) supported by an Infiniband packet are different from each other. In the mapping method of Yatin R. Acharya, they are set again so that the desired service can be used according to its service level in Infiniband interconnection network and mapping is performed using a DS to SL mapping table in an IP-to-Infiniband router.

Aamer Latif et al. suggest a new communication method in U.S. Pat. No. 6,400,730 (Method and apparatus for transferring data between IP network devices and SCSI and fibre channel devices over an IP network). In the method, data packets are transferred between IP network devices, SCSI devices or fiber channel devices. Aamer Latif et al. expand a conventional data packet exchange method supported only by the conventional same protocol so that the data packet exchange can be performed easily between different protocols.

Raul A. Aguilar et al. suggest a flexible input/output port configuration method in U.S. Pat. No. 6,199,137 (Method and device for controlling data flow through an IO controller). The device of U.S. Pat. No. 6,199,137 includes a list processor, a system bus interface and a port router and can change configuration of virtual input/output port, and insert and cancel the virtual input/output port.

However, the suggested conventional host channel adapter devices and methods do not support efficient data transfer protocol as well as optimal transfer flow without distributing bus usage ratio properly. So, the host channel adapter device is required to be invented to support above-mentioned functions.

SUMMARY OF THE INVENTION

Accordingly, the present invention is directed to a system for controlling data transfer protocol with a host bus interface that substantially obviates one or more problems due to limitations and disadvantages of the related art.

An object of the present invention is to provide a system for controlling data transfer protocol with a host bus interface to use a host interface bus efficiently and to distribute bus usage ratio properly so that optimal data transfer is supported and data transfer qualities are enhanced entirely by having a transmitting/receiving command DMA, a transmitting data DMA and a receiving data DMA and controlling data transfer protocol with a host bus considering characteristic, usage frequency, simultaneous processing functions of each DMA.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a system for controlling data transfer protocol with a host bus interface comprises: a transmitting/receiving command DMA including a command DMA request buffer and a command DMA response buffer to interface data transfer protocol control device, for instructing the command DMA request buffer to read command message data and providing the command DMA request buffer with address information of a corresponding host memory when reading the command message data, and for instructing the command DMA request buffer to write and providing the command DMA request buffer with the address information of the corresponding host memory and the command message data when writing the command message data; a transmitting data DMA including a transmitting data DMA request buffer, a transmitting data DMA response buffer and a transmitting data buffer to interface data transfer protocol control device, for instructing the transmitting data DMA request buffer to read the command message data and providing the transmitting data DMA request buffer with address information of a corresponding host memory and storing position address information of the transmitting data buffer; a receiving data DMA including a receiving data DMA request buffer, a receiving data DMA response buffer and a receiving data buffer to interface data transfer protocol control device, for instructing the receiving data DMA request buffer to write the command message data and providing the receiving data DMA request buffer with address information of a corresponding host memory and storing position address information of the receiving data buffer; and a data transfer protocol control device for putting read information on a host bus, receiving the command message data from the host memory and a transfer response signal representing whether reading is completed or not, and storing the transfer response signal in the command DMA response buffer when the command message data in the command DMA request buffer is a reading command, for putting write information and the command message data on the host bus, receiving the transfer response signal representing whether writing is completed or not, and storing the transfer response signal in the command DMA response buffer when the command message data in the command DMA request buffer is a writing command, for ascertaining a command of the transmitting data DMA request buffer, putting the ascertained command on the host bus, sorting data messages from the host memory at the position indicated by a storing address of the transmitting data buffer, receiving a transfer response signal representing whether reading is completed or not, and storing the transfer response signal in the transmitting data DMA response buffer, and for ascertaining a command of the receiving data DMA request buffer, putting the ascertained command and the data messages stored in the receiving data DMA request buffer on the host bus, receiving a transfer response signal representing whether writing is completed or not, and storing the transfer response signal in the receiving data DMA response buffer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
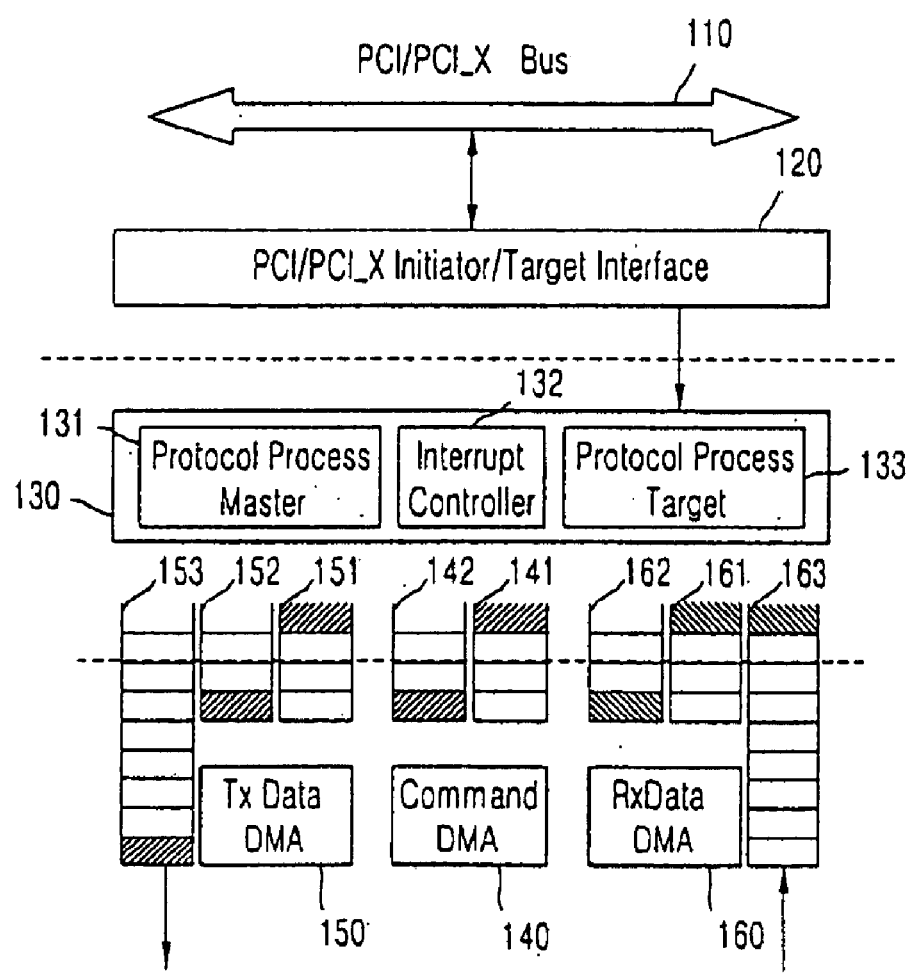
FIG. 1 is a block diagram of a system for controlling data transfer protocol according to the present invention.

FIG. 1 is a block diagram of a system for controlling data transfer protocol according to the present invention.

As shown in FIG. 1, the system of the present invention includes a data transfer protocol control device 130, a transmitting/receiving command DMA 140, a transmitting data DMA 150 and a receiving data DMA.

The data transfer protocol control device 130 controls a data transfer protocol in a host channel adapter that has a PCI/PCI-X host bus interface 120 of a PCI/PCI-X host bus 110 as a host processor interface. The data transfer protocol control device 130 includes a protocol process master 131, an interrupt controller 132 and a protocol process target 133. Buffers are provided for interface between the data transfer protocol control device 130 and each of the DMA.

In other words, a command DMA request buffer 141 and a command DMA response buffer 142 are provided to interface the transmitting/receiving command DMA 140. A transmitting data DMA request buffer 151 and a transmitting data DMA response buffer 152 and a transmitting data buffer 153 are provided to interface the transmitting data DMA 150. A receiving data DMA request buffer 161, a receiving data DMA response buffer 162 and a receiving data buffer 163 are provided to interface a receiving data DMA 160.

From now on, description will be made about operation and performing function of each of the components according to performing operation (read, write, etc.).

First, when reading a predetermined message from a host through the transmitting/receiving command DMA 140, the transmitting/receiving command DMA 140 sends a read command to a packet header of the command DMA request buffer 141 and provides an address of a corresponding host memory.

Accordingly, the data transfer protocol control device 130 confirms a command of the packet header stored in the command DMA request buffer 141.

To perform reading, the data transfer protocol control device 130 provides the PCI/PCI-X host bus interface 120 with the confirmed information according to the PCI/PCI-X bus protocol and the PCI/PCI-X host bus interface 120 drives the PCI/PCI-X bus 110. Here, if responsively, the message at the corresponding address is loaded on the PCI/PCI-X host bus 110, the PCI/PCI-X host bus interface 120 provides this message to the data transmitting protocol control device 130 and the data transmitting protocol control device 130 stores this message on the command DMA response buffer 142 according to a packet format to perform a read operation.

On the other hands, when writing a predetermined command message on the host memory through the transmitting/receiving command DMA 140, the transmitting/receiving command DMA 140 sends a write command to a packet header of the command DMA request buffer 141 and provides an address of a corresponding host memory and command message. The data transfer protocol control device 130 confirms a command of the packet header stored in the command DMA request buffer 141 and performs a write operation according to the confirmation.

In other words, the data transfer protocol control device 130 provides a PCI/PCI-X host bus interface 120 with the confirmed information (host memory address and message) according to a PCI/PCI-X bus protocol and the PCI/PCI-X host bus interface 120 puts the corresponding signal on the PCI/PCI-X host bus 110. Then, when the corresponding address and message are put on the PCI/PCI-X host bus 110 and completed to be transferred to the host memory, a transfer signal is put on the PCI/PCI-X host bus 110 and the PCI/PCI-X host bus interface 120 detects the transfer signal and informs the data transfer protocol control device of the fact that the transfer is completed. The data transfer protocol control device 130 put the transfer complete information on the packet header to store a response packet in the command DMA response buffer 142.

On the other hand, when fetching a data message from the host memory, the transmitting data DMA 150 sends a read command to the packet header of the transmitting data DMA request buffer 151 and provides the address of the corresponding host memory and storage location address of the transmitting data buffer 153. The data transfer protocol control device 130 confirms the command of the packet header stored in the transmitting data DMA request buffer 151 and provides the PCI/PCI-X host bus interface 120 with the confirmed information according to the PCI/PCI-X bus protocol to perform read operation.

Accordingly, the PCI/PCI-X host bus interface 120 puts the corresponding signal on the PCI/PCI-X host bus 110. As a response, if when the data message from the host memory is put on the PCI/PCI-X bus, this message is transferred to the transfer protocol control device 130.

The data transfer protocol control device 130 sorts this data message at the storage location address of the confirmed transmitting data buffer 153 and sends the transmitting data storing complete information to the packet header to store a response packet in the transmitting data DMA response buffer 152. On the other hand, when writing a predetermined data message on the host memory, the receiving data DMA 160 sends a write command to the packet header of the receiving data DMA request buffer 161 and provides the address of the corresponding host memory and the storage location address information of the receiving data buffer 163. Accordingly, the data transfer protocol control device 130 confirms the command of the packet header stored in the receiving data DMA request buffer 161 and read necessary information (address of a host memory and data message stored in the receiving data buffer 163) according to PCI/PCI-X bus protocol to provide the information to the PCI/PCI-X host bus interface 120.

The PCI/PCI-X host bus interface 120 puts the corresponding signal on the PCI/PCI-X host bus 110. Here, when the corresponding address and message are put on the PCI/PCI-X host bus 110 and completed to be transferred to the host memory, a transfer termination signal is put on the PCI/PCI-X bus and the PCI/PCI-X host bus interface 120 detects this signal and informs, the data transfer protocol control device 130 of the fact that the transfer is completed. Accordingly, the data transfer protocol control device 130 sends a receiving data write complete information to the packet header and stores the response packet in the receiving data DMA response buffer 162.

Hereafter, referring to FIGS. 2a to 4, the configuration of buffer and data packet of each DMA will be described.

Figure 2A:
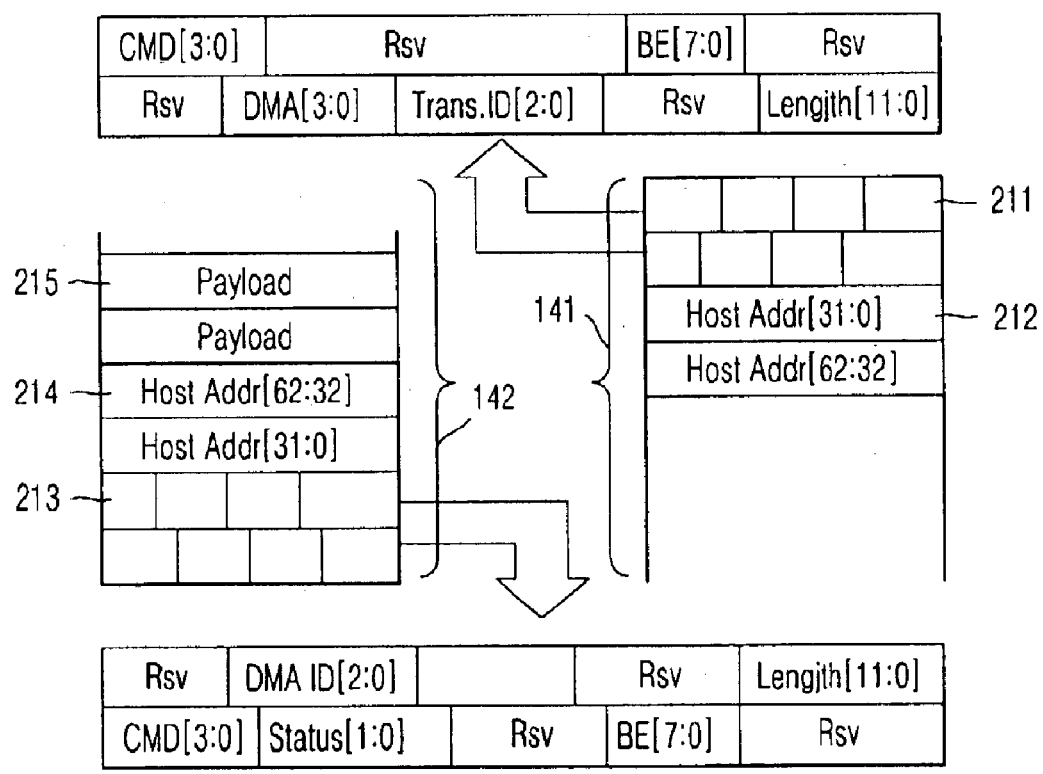
FIG. 2a illustrates configuration and packet of a command DMA buffer to perform a read request according to the present invention.

FIG. 2a illustrates configuration and packet of a command DMA buffer to perform a read request according to the present invention.

Referring to FIG. 2a, command DMA buffer includes the command DMA request buffer 141 and the command DMA response buffer 142. At most 8 packets can be stored in the command DMA request buffer 141 and each packet includes a request packet header 211 and a host memory address section 212. The request packet header 211 includes a 4-bit command field, an 8-bit byte enable field, a 4-bit DMA ID field, a 3-bit transaction ID field and a 12-bit message size field. The host memory address section 212 is represented in 64 bits and divided into two 32-bit fields to be stored. The command DMA response buffer 142 can store eight packets at most, similarly. Each packet includes the response packet header 213 and a host memory address section 214. The response packet header 213 further has 2-bit state field in comparison with the request packet header 211 and the remaining parts are the same. Using the structure of the buffer, the transmitting/receiving command DMA 140 requests a host memory to read a message and confirms the response.

In other words, the transmitting/receiving command DMA 140 set a read command bit of a command field of the request packet header 211 to fetch a message from a host memory and set the byte enable field to be a corresponding value according to th message size. A DMA ID field and a transaction ID field is set to be a distinguishable DMA ID value and a transaction ID value indicating a packet of the command DMA request buffer 141 and puts the size information of the corresponding request message on the message size field. The memory address to be read is put on the host memory address section 212 to make one request packet. The data transfer protocol control device 130 confirms this request packet to read the host memory. If an error occurs in reading the corresponding message, an error information is set in the state field of the response packet header 213 to report a read transfer error. If a read transfer is normally completed, the complete information is set to report that the read transfer is completed without any problem. Here, the response packet that is read completely includes a response packet header 213, a host memory address section 214 and a read message data 215. The read message data 215 are stored as much as the set request message size. Accordingly, the transmitting/receiving command DMA 140 uses the stored read message data according to its necessity.

Figure 2B:
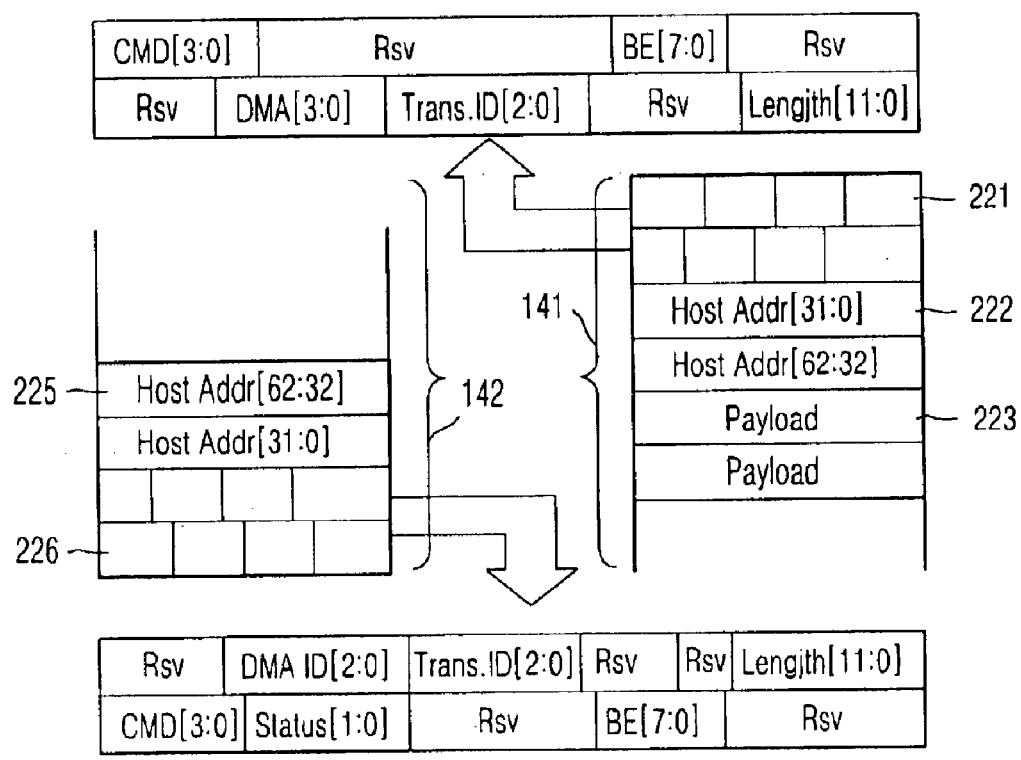
FIG. 2b illustrates configuration and packet of a command DMA buffer to perform a write request according to the present invention.

FIG. 2b illustrates configuration and packet of a command DMA buffer to perform a write request according to the present invention.

Referring to FIG. 2b, buffers for each of read and write are not provided but a buffer is used commonly since the command DMA buffer can perform both read and write operations with a command request buffer 141 and a command DMA response buffer 142. For command DMA write operation, the request packet includes a packet header 221, a host memory address section 222 and a write message data 223. The write request packet header 221 has the same data structure of the request packet header 211 of the time of requesting to read. The data transfer protocol control device 130 informs the transmitting/receiving command DMA 140 of the fact whether the message write operation is completed normally or not through the state field of the response packet header 226. At this time, the response packet that is completed to write includes a response packet header 226 and a host memory address 225.

Figure 3:
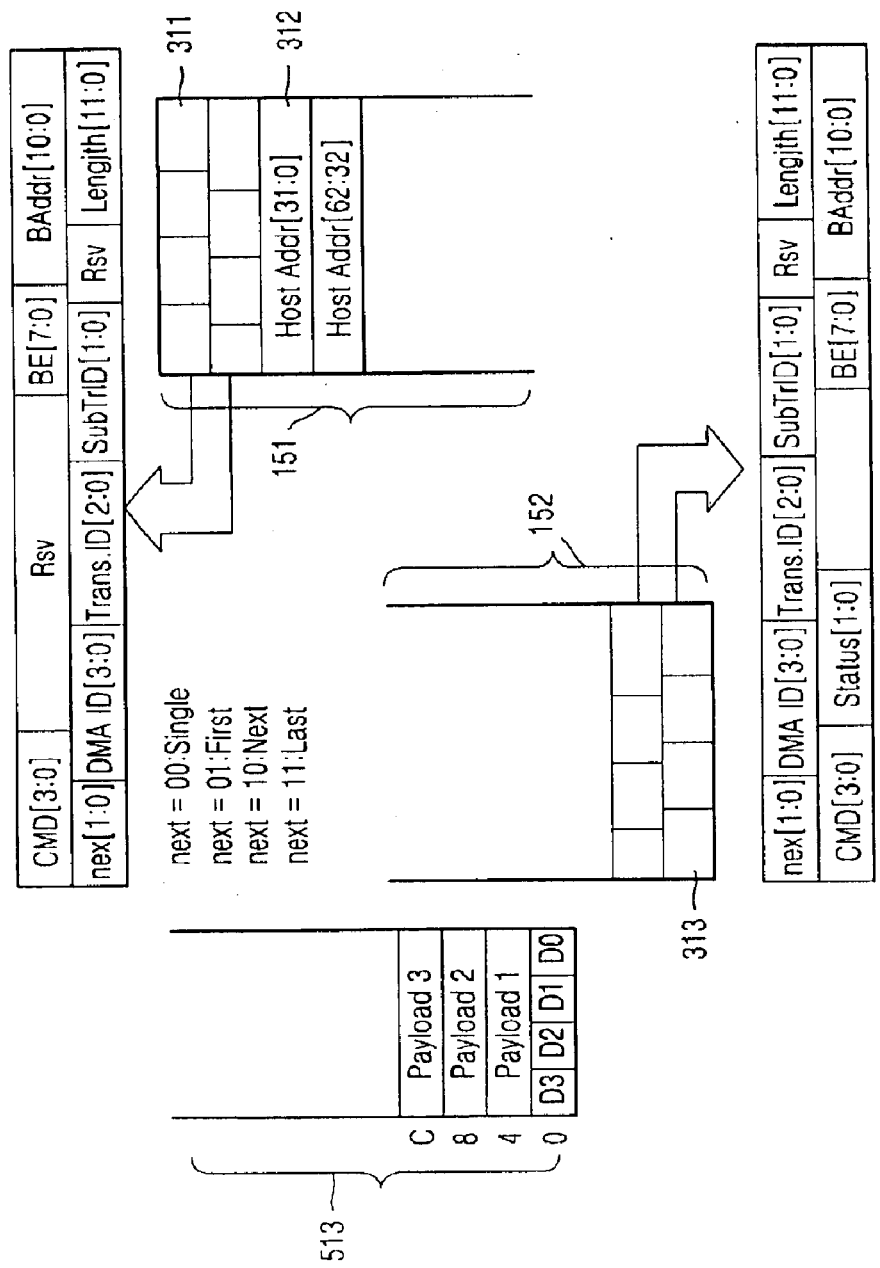
FIG. 3 illustrates configuration and packet of transmitting data DMA to perform a read request according to the present invention.

FIG. 3 illustrates configuration and packet of transmitting data DMA to perform a read request according to the present invention.

Referring to FIG. 3, the transmitting data DMA buffer includes a transmitting data DMA request buffer 151, a transmitting data DMA response buffer 152 and a transmitting data buffer 153. The transmitting data DMA request buffer 151 can store 16 packets at most and each of the packets includes a request packet header 311 and a host memory address section 312. The request packet header 311 includes a 4-bit command field, a 8-bit byte enable field, a 11-bit transmitting data buffer address, a 2-bit packet interconnection field, a 4-bit DMA ID field, 3-bit transaction ID field, a 2-bit subtransaction ID field and a 12-bit message size field. The host memory address section 312 is expressed in 64 bits and divided into two 32-bit fields to be stored. The transmitting data DMA response buffer 152 can store 16 packets at most as same as the transmitting data DMA request buffer 151. Each of the packets includes only one response packet header 313. The response packet header 313 further has a 2-bit state field in comparison with the request packet header 311. The remaining parts are the same. The transmitting data buffer 153 consists purely of message data and the space to store a result message according to a request of the transmitting data DMA request buffer 151. Due to this buffer structure, the transmitting data DMA 150 reads a predetermined message from the host memory as the followings.

In other words, the transmitting data DMA 150 sets read command bit on the command field of the request packet header 311, sets the byte enable field to be a corresponding value depending on the size of the message and sets address of the transmitting data buffer 153 in which the read message is stored. At this time, one message is divided into a few divisions and requested contrary to the transmitting/receiving command DMA 140 since the messages for the transmitting data DMA 150 is big.

In other words, the packet interconnection field is set to be '00' when requesting one complete message. The packet interconnection field is set to be '01' when requesting a first divided message. The packet interconnection field is set to be '10' when requesting a middle divided message. The packet interconnection field is set to be '11' when requesting a last divided message. Distinguishable DMA ID value and transaction ID value that indicate packet of the transmitting data DMA request buffer 151 are set to the DMA ID field and the transaction ID field, respectively. A value is set to the subtransaction ID field and used when further dividing a message and requesting the further divided message. The corresponding request message size is put on the message size field and a host memory address to be read is put on a host memory address section 312 so that one request packet is completed and the data transfer protocol control device 130 to requested to read and transfer a data message. The data transfer protocol control device 130 performs the corresponding message read transfer request and stores the message received as the response at the set address of the transmitting data buffer 153. The data transfer protocol control device 130 sets the information whether the error occurs on the state field of the response packet header 313 or not. The data transfer protocol control device 130 stores this response packet in the transmitting data DMA response buffer 152.

Figure 4:
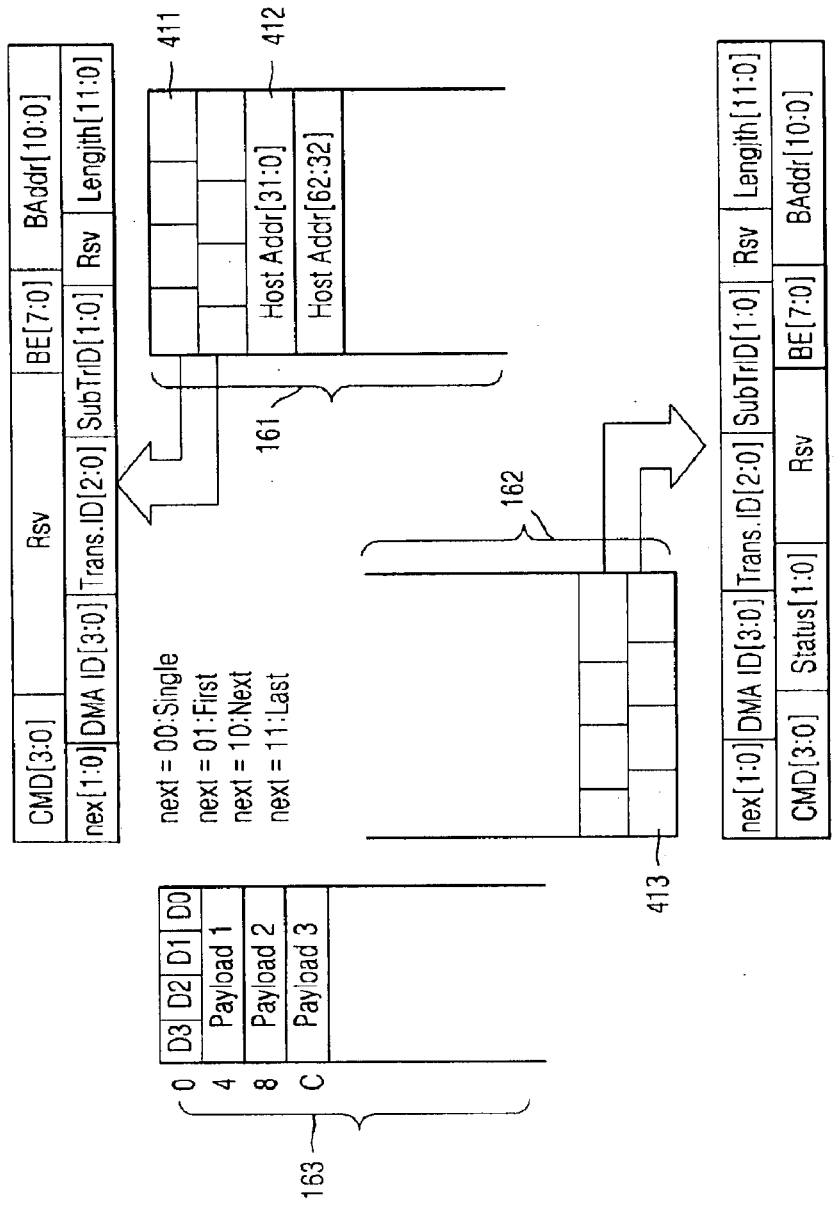
FIG. 4 illustrates configuration and packet of receiving data DMA to perform a read request according to the present invention.

FIG. 4 illustrates configuration and packet of receiving data DMA to perform a read request according to the present invention.

Referring to FIG. 4, the receiving data DMA buffer includes a receiving data DMA request buffer 161, a receiving DMA response buffer 162 and a receiving data buffer 163. The receiving data DMA request buffer 161 can store 16 packets at most and each of packets includes a request packet header 411 and a host memory address section 412. The request packet header 411 includes a 4-bit command field, an 8-bit byte enable field, an 11-bit receiving data buffer address, a 2-bit packet interconnection field, a 4-bit DMA ID field, 3-bit transaction ID field, a 2-bit subtransaction ID field and a 12-bit message size field. The host memory address section 412 is expressed in 64 bits and divided into two 32-bit fields to be stored. The receiving data DMA response buffer 162 can store 16 packets at most as same as the receiving data DMA request buffer 161. Each of the packets includes only one response packet header 413. The response packet header 413 further has a 2-bit state field in comparison with the request packet header 411. The remaining parts are the same. The transmitting data buffer 163 consists purely of message data and the space to temporarily store message data during write operation of the receiving data DMA 160. The receiving data DMA 160 sets each field of the packet header of the receiving data DMA request buffer 161 to write the message data stored in the receiving data buffer 163 in the host memory. The set contents as similar to the above-description on the transmitting data DMA request buffer 151.

The data transfer protocol control device 130 confirms each field of the request packet header 411 and a host memory address and reads message data as much as the corresponding size form the receiving data buffer 163 to perform a message write operation on the host memory according to the read message. The data transfer protocol control device 130 ascertains whether errors occur during the write transfer or normal complete though the PCI/PCI-X host bus interface 120. The data transfer protocol control device 130 sets the state field of the response packet header 413 and stores this response packets in the receiving data DMA response buffer 163.

Figure 5A:
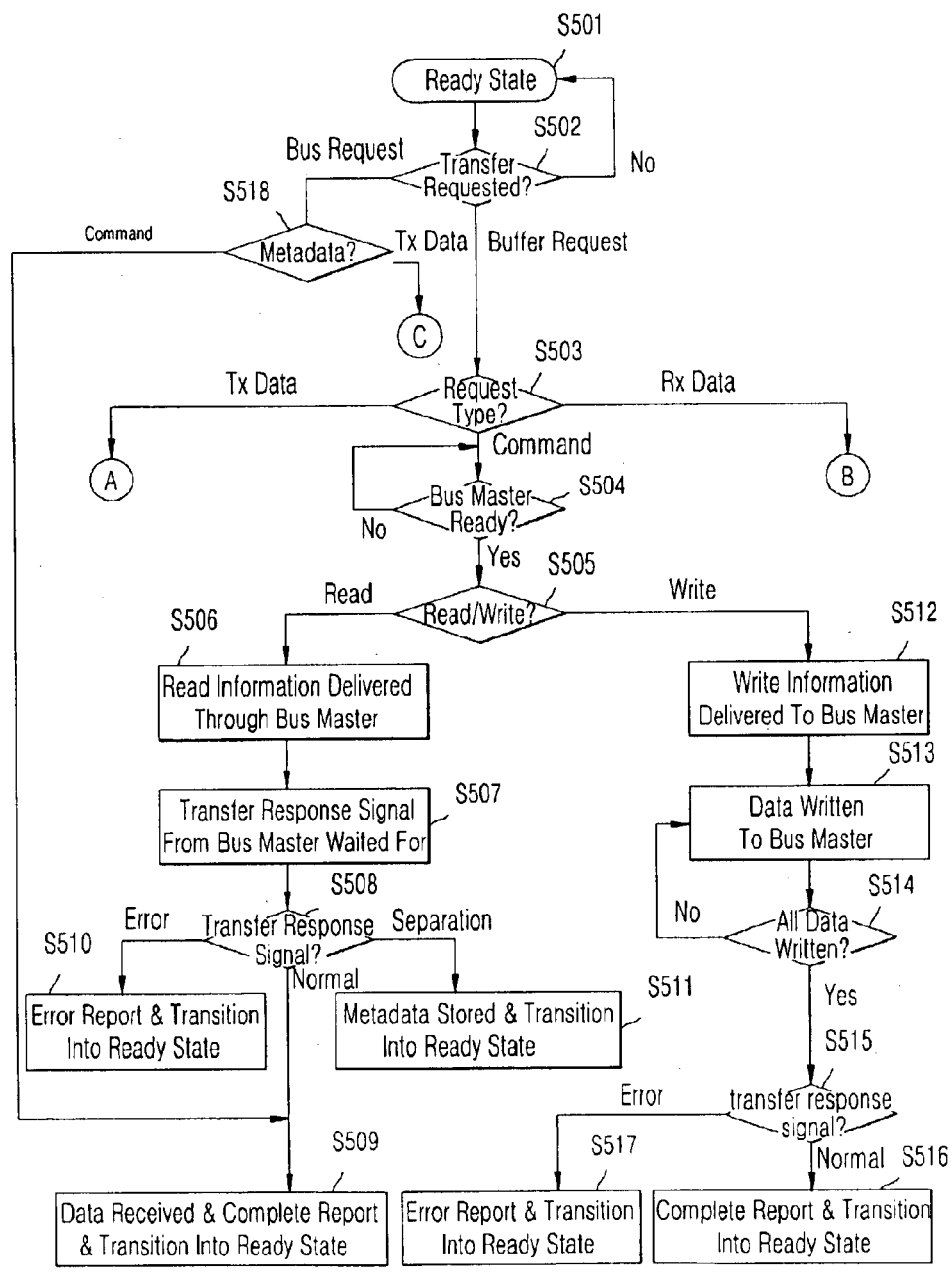
FIG. 5a is a flowchart of transfer request of a commend DMA of data transfer protocol control process according to the present invention.
Figure 5B:
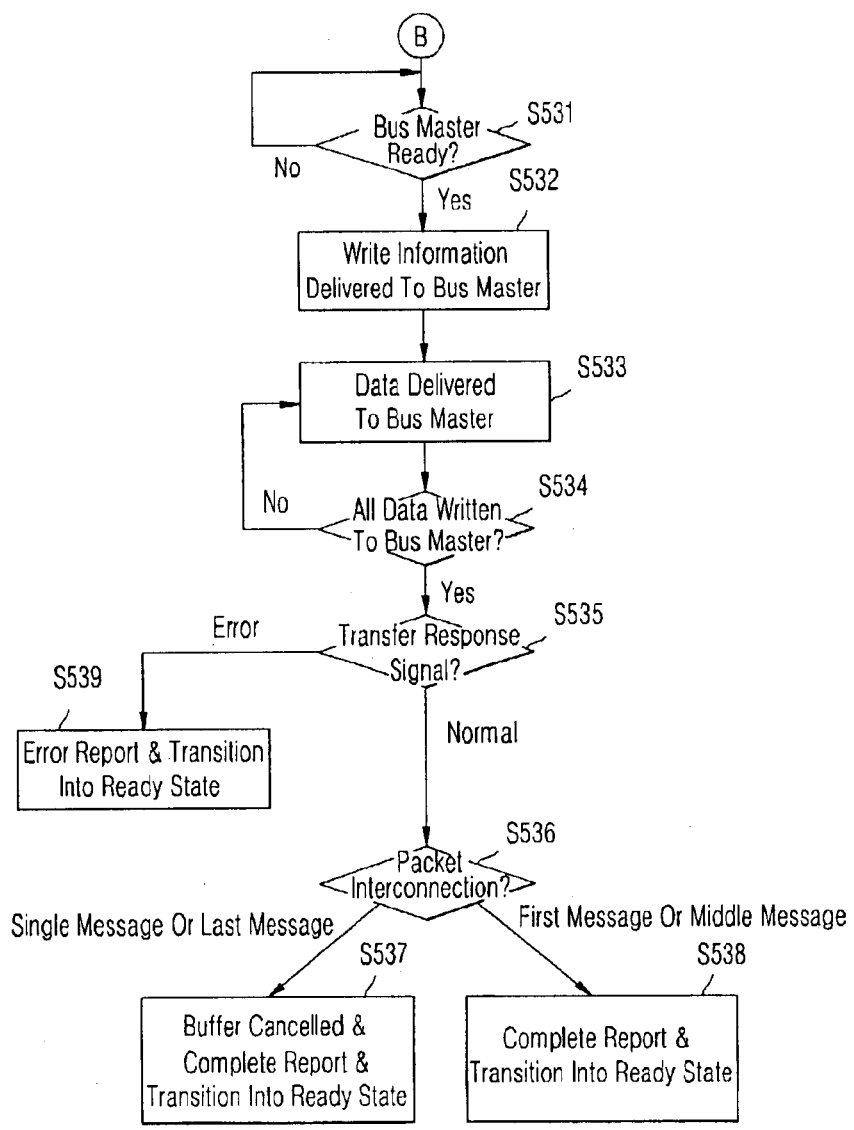
FIG. 5b is a flowchart of transfer request of a transmitting data DMA of data transfer protocol control process according to the present invention.
Figure 5C:
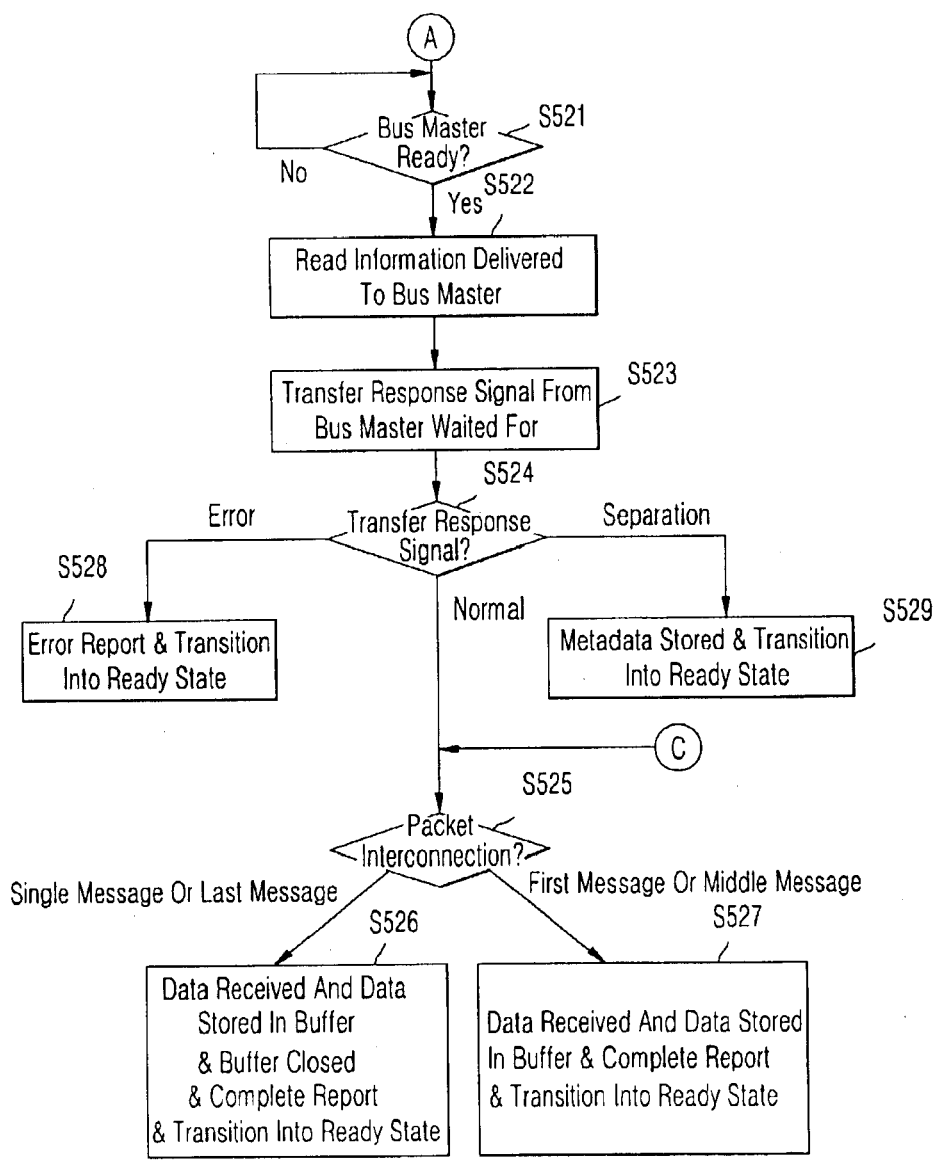
FIG. 5c is a flowchart of transfer request of a receiving data DMA of data transfer protocol control process according to the present invention.

FIGS. 5a to 5c is a flowchart of the operation of the data transfer protocol control device 130 (especially a protocol process master 131) according to the present invention.

The protocol process master 131 of the data transfer protocol control device 130 waits being ready. If the protocol process master 131 detects a transfer request (S501), it determines whether the transfer request is a transfer request from the internal DMA or a bus request driven by a PCI/PCI-X bus (S502). At this time, if the transfer request is the transfer request from the internal DMA, it is determined whether the request is a command DMA request, a transmitting data DMA request or a receiving data DMA request (S503). If the request is the command DMA 140, as shown in FIG. 5a, the protocol process master 131 confirms the ready state of the PCI/PCI-X host bus interface 120 (S504) and reads the request packet header 211 of the command DMA request buffer 141 to determine whether the request is a read transfer request or a write transfer request (S505). At this time, if the PCI/PCI-X host bus interface 120 is transferable and the request is a read request, the corresponding read information is put to the PCI/PCI-X host bus interface 120 and a signal is put on the host bus 110 (S506). The transfer response signal of the host bus is waited for (S507).

If the transfer response signal is delivered from the host bus 110, the transfer response signal is analyzed to ascertain whether any error occurs or not (S508). If the read transfer is completed normally, the protocol process master 131 processes the message received through the PCI/PCI-X host bus interface 120 in the shape of response packet, stores it in the command DMA response buffer 142, sets the transfer complete bit in the state field of the response packet header 213 and transits to the ready state (S509). If the bus transfer response signal indicates a transfer error, the data transfer protocol control device 130 sets an error bit on the state field of the response packet header 213, stores it in the command DMA response buffer 142 and transits to the ready state (S510). If the bus transfer response signal is separate response, the metadata for the request packet of the current state is stored in the internal table and transits to the ready state since it means that the message will be responded later. Later, when the response message arrives, the final transfer is completed through the step S509 (S511).

On the other hand, if the PCI/PCI-X host bus interface 120 is transferable and the request is write request, the data transfer protocol control device 130 puts the corresponding write information on the PCI/PCI-X host bus interface 120 and a signal is put on the host bus 110 (S512). Message data as much as message size are put on the PCI/PCI-X host bus interface 120 continually and put on the host bus (S513, S514). All the message data are put on the host bus 110 and the bus transfer response signal is waited for. The put bus transfer response signal is analyzed to determine whether message transfer is operated normally (S515). At this time, if the write operation is normally completed, a transfer complete bit of the state field of a response packet header 226 is set to transit to the ready state (S516). If bus transfer response signal indicates the transfer error, an error bit is set in the response packet header 226 to transit to the ready state (S517).

If the request is a transmitting data DMA request, as shown in FIG. 5*b*, the data transfer protocol control device 130 confirms the ready state of the PCI/PCI-X host bus interface 120 (S521) and reads a packet header stored in the transmitting data DMA request buffer 151 to put the corresponding information on the PCI/PCI-X host bus interface 120 and put a signal on the host bus 110 (S522). The transfer response signal of the host bus 110 is waited for (S523). If the bus transfer response signal is delivered through a PCI/PCI-X host bus interface 120, it is analyzed to confirm error occurrence, normal transfer and separate transfer (S524). Here, if the normal transfer is completed, the packet interconnection field is checked to ascertain whether either a single message or a last message is transferred or either a first message or a middle successive message is transferred (S525). If the single message or the last message is transferred, received message data are stored in the transmitting data buffer 153 and the transmitting data buffer 153 is closed. A transfer complete bit of the response packet header 313 is set. This response packet is stored in the transmitting data DMA response buffer 152 and transits to ready state (S526).

If the first message or the middle message is transferred, received message data are stored in the transmitting data buffer 153 and a transfer complete bit of the response packet header 313 is set. This response packet is stored in the transmitting data DMA response buffer 153 and it transits into the ready state (S527). At this time, the transmitting data buffer 153 is not closed and next message is allowed to be written on the space of successive address. If the bus transfer response signal is analyzed to confirm a transfer error, the data transfer protocol control device 130 sets a transfer error bit of the response packet header 313 and stores this request packet in the transmitting data DMA response buffer 152, and it transits into the ready state (S528). If the transfer response signal indicates separate response, metadata of the request packet of a current state are stored in an internal table and it transits into the ready state (S529). Later, when a response message arrives, the final transfer is finished through the steps S525 to S527.

On the other hand, in the case of the transfer request of the receiving data DMA 160, as shown in FIG. 5*c*, the data transfer protocol control device 130 confirms the ready state of the PCI/PCI-X host bus interface 120 (S531), reads a packet header 411 stored in the receiving data DMA request buffer 161, puts the corresponding write information on the PCI/PCI-X host bus interface 120 and puts the signal on the host bus 110 (S532). The data transfer protocol control device 130 reads message stored in the receiving data buffer 163 and delivers it as much as the size of the message successively to the PCI/PCI-X host bus interface 120 to put the signal on the host bus 110 (S533, S534). All the data of the received message are put on the bus and the bus transfer response signal from a host is waited for. This bus transfer response signal is delivered and analyzed to ascertain whether error occurs or transfer is completed normally (S535). At the same time, if the transfer is completed without any error, the packet interconnection field is confirmed to determined whether the transfer is either a single message transfer or a last message transfer or the transfer is either a first message transfer or a middle message transfer (S536). If the transfer is either a single message transfer or a last message transfer, the data transfer protocol control device 130 clears the receiving data buffer 163, sets a transfer complete bit of the response packet header 413 and stores this response packet in the receiving data DMA response buffer 162. It transits into the ready state (S537). If the first message or the middle successive message is transferred, the transfer complete bit of the response packet header 413 is set and this response packet is stored in the receiving data DMA response buffer 162. It transits into the ready state (S538). At this time, the receiving data buffer 162 is not cleared since the final transfer is not completed. If the transfer response signal indicates transfer error, the data transfer protocol control device 130 sets a transfer error bit of the response packet header 413 and stores this response packet in the receiving data DMA response buffer 162. It transits into the ready state (S539).

On the other hand, if it is determined that the transfer request is the bus request for separate response put on the PCI/PCI-X bus, the data transfer protocol control device 130 compares metadata stored in the internal table to check whether it is the separate response for request to read a command DMA or the separate response for request to read a transmitting data DMA 150 (S518). Here, if it is the separate response for request to read the command DMA, it transits into the step S509. If it is the separate response for request to read a transmitting data DMA 150, it transits into the step S525. After that, as described above, the remaining operation is completed As described, the data transfer protocol control system with a host bus interface according to the present invention includes a transmitting/receiving command DMA, transmitting data DMA and a receiving data DMA considering characteristic, usage frequency, simultaneous processing functions of the command DMA and the data DMAs. Each DMA buffer structure and packet structure are improved, a host interface bus is efficiently used and bus usage ratio is distributed properly to support transfer flow properly and improve the entire system performance.

The above descriptions are for a kind of embodiment to implement a data transfer protocol control system and method with a host bus interface according to the present invention. The present invention is not bounded to the embodiment. It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A data transfer protocol control system with a host bus interface, the system comprising:
   a transmitting/receiving command DMA including a command DMA request buffer and a command DMA response buffer to interface a data transfer protocol control device, for instructing the command DMA request buffer to read command message data and providing the command DMA request buffer with address information of a corresponding host memory when reading the command message data, and for instructing the command DMA request buffer to write and providing the command DMA request buffer with the address information of the corresponding host memory and the command message data when writing the command message data;

a transmitting data DMA including a transmitting data DMA request buffer, a transmitting data DMA response buffer and a transmitting data buffer to interface the data transfer protocol control device, for instructing the transmitting data DMA request buffer to read the command message data and providing the transmitting data DMA request buffer with address information of a corresponding host memory and storing position address information of the transmitting data buffer;

a receiving data DMA including a receiving data DMA request buffer, a receiving data DMA response buffer and a receiving data buffer to interface the data transfer protocol control device, for instructing the receiving data DMA request buffer to write the command message data and providing the receiving data DMA request buffer with address information of a corresponding host memory and storing position address information of the receiving data buffer; and the data transfer protocol control device for putting read information on a host bus, receiving the command message data from the host memory and a transfer response signal representing whether reading is completed or not, and storing the transfer response signal in the command DMA response buffer when the command message data in the command DMA request buffer is a reading command, for putting write information and the command message data on the host bus, receiving the transfer response signal representing whether writing is completed or not, and storing the transfer response signal in the command DMA response buffer when the command message data in the command DMA request buffer is a writing command, for ascertaining a command of the transmitting data DMA request buffer, putting the ascertained command on the host bus, sorting data messages from the host memory at the position indicated by a storing address of the transmitting data buffer, receiving a transfer response signal representing whether reading is completed or not, and storing the transfer response signal in the transmitting data DMA response buffer, and for ascertaining a command of the receiving data DMA request buffer, putting the ascertained command and the data messages stored in the receiving data DMA request buffer on the host bus, receiving a transfer response signal representing whether writing is completed or not, and storing the transfer response signal in the receiving data DMA response buffer.

2. The system as claimed in claim 1, wherein the command DMA request buffer accommodates eight request packets each of which includes a request packet header and a host memory address section when requesting to read, and each request packet including a request packet header, a host memory address section and a write message data section when requesting to write; and the command DMA response buffer accommodates eight response packets each of which includes a response packet header, a host memory address section and a read message data section when responding to read, and each response packet including a response packet header and a host memory address section when responding to write.

3. The system as claimed in claim 2, wherein the request packet header includes a command field, a byte enable field, a DMA ID field, a transaction ID field and a message size field; and the host memory address section is expressed in 64 bits and divided into two fields of 32 bits to store host memory address data.

4. The system as claimed in claim 2, wherein the response packet header further has a 2-bit state field to store a transfer response signal representing whether normal transfer is completed or not compared with the request packet header.

5. The system as claimed in claim 1, wherein the transmitting data DMA request buffer accommodates 16 packets each of which includes a request packet header and a host memory address section; and the transmitting data DMA response buffer accommodates 16 packets each of which includes only a response packet header.

6. The system as claimed in claim 1, wherein request packet headers of the transmitting data DMA request buffer and the receiving data DMA request buffer include a command field, a byte enable field, a transmitting data buffer address field, a packet interconnection field, a DMA ID field, a transaction ID field, a subtransaction ID field and a message size field.

7. The system as claimed in claim 6, wherein the transmitting data DMA and the receiving data DMA request a data message from the host memory by:

setting the packet interconnection field to be '00' when requesting one complete message;

setting the packet interconnection field to be '01' when dividing a message and requesting a first divided message;

setting the packet interconnection field to be '10' when dividing a message and requesting a middle divided message;

setting the packet interconnection field to be '11' when dividing a message and requesting a last divided message.

8. The system as claimed in claim 6, wherein the transmitting data DMA and the receiving data DMA set the DMA ID field and the transaction ID field of the request packet headers thereof to be distinguishable DMA ID value and transaction ID value that indicate packet of the transmitting data DMA request buffer respectively, and use the subtransaction ID field when further dividing a message and requesting the further divided message.

9. The system as claimed in claim 6, wherein the data transfer protocol control device transmits the read information to the host bus and analyzes a transfer response signal from the host bus when performing a read command of the transmitting/receiving command DMA;

the data transfer protocol control device sets a transfer complete bit of a state field of a response packet header of the command DMA response buffer when the transfer response signal indicates normal transfer;

the data transfer protocol control device sets a transfer error bit of the state field of the response packet header of the command DMA response buffer when the transfer response signal indicates transfer error; and the data transfer protocol control device stores metadata of request packet of a current state in an internal table when the transfer response signal indicates separate response, and finishes final transfer when a response message arrives.

10. The system as claimed in claim 1, wherein the data transfer protocol control device transmits the read information to the host bus and analyzes a transfer response signal from the host bus when performing a read command of the transmitting/receiving command DMA;

the data transfer protocol control device sets a transfer complete bit of a state field of a response packet header of the command DMA response buffer when the transfer response signal indicates normal transfer; and the data transfer protocol control device sets a transfer error bit of the state field of the response packet header of the command DMA response buffer when the transfer response signal indicates transfer error.

11. The system as claimed in claim 1, wherein the data transfer protocol control device transmits the read information to the host bus and analyzes a transfer response signal from the host bus when performing a read command of the transmitting data DMA;

the data transfer protocol control device ascertains whether either a single message or a last message is transferred or either a first message or a middle successive message is transferred when the transfer response signal indicates normal transfer;

the data transfer protocol control device stores received message data in the transmitting data buffer, closes the transmitting data buffer and sets a transfer complete bit of a response packet header of the command DMA response buffer when the single message or the last message is transferred;

the data transfer protocol control device stores received message data in the transmitting data buffer, does not close the transmitting data buffer and sets a transfer complete bit of the response packet header of the command DMA response buffer when the first message or the middle message is transferred;

the data transfer protocol control device sets a transfer error bit of a state field of the response packet header of the command DMA response buffer when the transfer response signal indicates transfer error; and the data transfer protocol control device stores metadata of request packet of a current state in an internal table when the transfer response signal indicates separate response, and finishes final transfer when a response message arrives.

12. The system as claimed in claim 1, wherein the data transfer protocol control device transmits the write information to the host bus and analyzes a transfer response signal from the host bus when performing a write command of the receiving data DMA;

the data transfer protocol control device ascertains whether either a single message or a last message is transferred or either a first message or a middle successive message is transferred when the transfer response signal indicates normal transfer;

the data transfer protocol control device clears the receiving data buffer and sets a transfer complete bit of a response packet header of the command DMA response buffer when the single message or the last message is transferred;

the data transfer protocol control device does not clear the receiving data buffer and sets a transfer complete bit of the response packet header of the command DMA response buffer when the first message or the middle message is transferred; and the data transfer protocol control device sets a transfer error bit of a state field of the response packet header of the command DMA response buffer when the transfer response signal indicates transfer error.

13. A data transfer protocol control system with a host bus interface, the system comprising:

a data transfer protocol control device;

a transmitting/receiving command DMA including a command DMA request buffer and a command DMA response buffer to interface with said data transfer protocol control device, said transmitting/receiving command DMA for instructing the command DMA request buffer to read command message data and providing the command DMA request buffer with address information of a corresponding host memory when reading the command message data, and for instructing the command DMA request buffer to write and providing the command DMA request buffer with the address information of the corresponding host memory and the command message data when writing the command message data, said command DMA request buffer accommodating a plurality of request packets each including a request packet header and a host memory address section when requesting to read, and each request packet including a request packet header, a host memory address section and a write message data section when requesting to write, said command DMA response buffer accommodating a plurality of response packets each including a response packet header, a host memory address section and a read message data section when responding to read, and each response packet including a response packet header and a host memory address section when responding to write;

a transmitting data DMA including a transmitting data DMA request buffer, a transmitting data DMA response buffer and a transmitting data buffer to interface with said data transfer protocol control device, said transmitting data DMA for instructing the transmitting data DMA request buffer to read the command message data and providing the transmitting data DMA request buffer with address information of a corresponding host memory and storing position address information of the transmitting data buffer;

a receiving data DMA including a receiving data DMA request buffer, a receiving data DMA response buffer and a receiving data buffer to interface with said data transfer protocol control device, said receiving data DMA for instructing the receiving data DMA request buffer to write the command message data and providing the receiving data DMA request buffer with address information of a corresponding host memory and storing position address information of the receiving data buffer;

said data transfer protocol control device for putting read information on a host bus, receiving the command message data from the host memory and a transfer response signal representing whether reading is completed or not, and storing the transfer response signal in the command DMA response buffer when the command message data in the command DMA request buffer is a reading command, for putting write information and the command message data on the host bus, receiving the transfer response signal representing whether writing is completed or not, and storing the transfer response signal in the command DMA response buffer when the command message data in the command DMA request buffer is a writing command, for ascertaining a command of the transmitting data DMA request buffer, putting the ascertained command on the host bus, sorting data messages from the host memory at the position indicated by a storing address of the transmitting data buffer, receiving a transfer response signal representing whether reading is completed or not, and storing the transfer response signal in the transmitting data DMA response buffer, and for ascertaining a command of the receiving data DMA request buffer, putting the ascertained command and the data messages stored in the receiving data DMA request buffer on the host bus, receiving a transfer response signal representing whether writing is completed or not, and storing the transfer response signal in the receiving data DMA response buffer.

14. The system as claimed in claim 13, wherein the request packet header includes a command field, a byte enable field, a DMA ID field, a transaction ID field and a message size field; and the host memory address section is expressed in 64 bits and divided into two fields of 32 bits to store host memory address data.

15. The system as claimed in claim 13, wherein the response packet header further has a 2-bit state field to store a transfer response signal representing whether normal transfer is completed or not compared with the request packet header.

16. A data transfer protocol control system with a host bus interface, the system comprising:

a data transfer protocol control device;

a transmitting/receiving command DMA including a command DMA request buffer and a command DMA response buffer to interface with said data transfer protocol control device, for instructing the command DMA request buffer to read command message data and providing the command DMA request buffer with address information of a corresponding host memory when reading the command message data, and for instructing the command DMA request buffer to write and providing the command DMA request buffer with the address information of the corresponding host memory and the command message data when writing the command message data;

a transmitting data DMA including a transmitting data DMA request buffer, a transmitting data DMA response buffer and a transmitting data buffer to interface with the data transfer protocol control device, said transmitting data DMA for instructing the transmitting data DMA request buffer to read the command message data and providing the transmitting data DMA request buffer with address information of a corresponding host memory and storing position address information of the transmitting data buffer, said transmitting data DMA request buffer accommodating a plurality of request packets each of which includes a request packet header and a host memory address section, and said transmitting data DMA response buffer accommodating a plurality of response packets each of which includes only a response packet header;

a receiving data DMA including a receiving data DMA request buffer, a receiving data DMA response buffer and a receiving data buffer to interface with said data transfer protocol control device, for instructing the receiving data DMA request buffer to write the command message data and providing the receiving data DMA request buffer with address information of a corresponding host memory and storing position address information of the receiving data buffer; and said data transfer protocol control device for putting read information on a host bus, receiving the command message data from the host memory and a transfer response signal representing whether reading is completed or not, and storing the transfer response signal in the command DMA response buffer when the command message data in the command DMA request buffer is a reading command, for putting write information and the command message data on the host bus, receiving the transfer response signal representing whether writing is completed or not, and storing the transfer response signal in the command DMA response buffer when the command message data in the command DMA request buffer is a writing command, for ascertaining a command of the transmitting data DMA request buffer, putting the ascertained command on the host bus, sorting data messages from the host memory at the position indicated by a storing address of the transmitting data buffer, receiving a transfer response signal representing whether reading is completed or not, and storing the transfer response signal in the transmitting data DMA response buffer, and for ascertaining a command of the receiving data DMA request buffer, putting the ascertained command and the data messages stored in the receiving data DMA request buffer on the host bus, receiving a transfer response signal representing whether writing is completed or not, and storing the transfer response signal in the receiving data DMA response buffer.

* * * * *